C. H. BUDD.
SAW GAGE.
APPLICATION FILED SEPT. 29, 1919.
1,382,059.
Patented June 21, 1921.
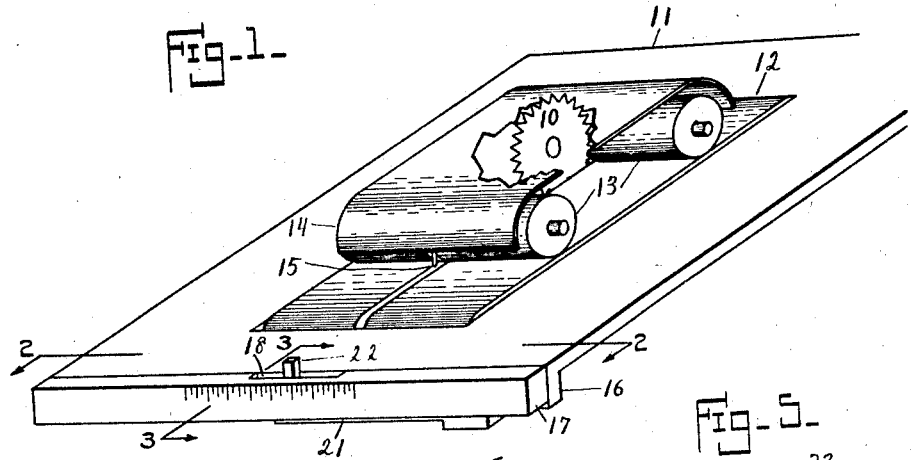
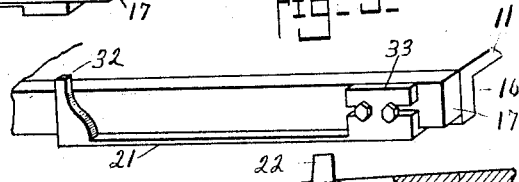
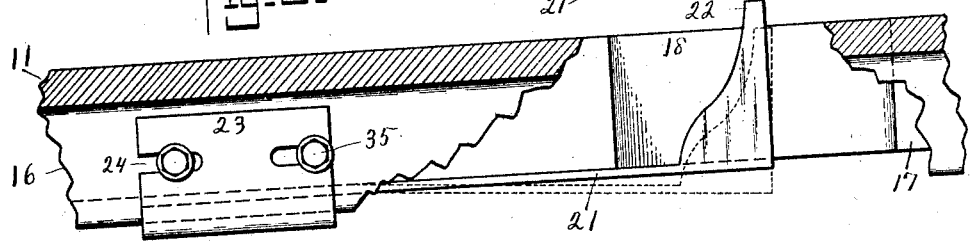
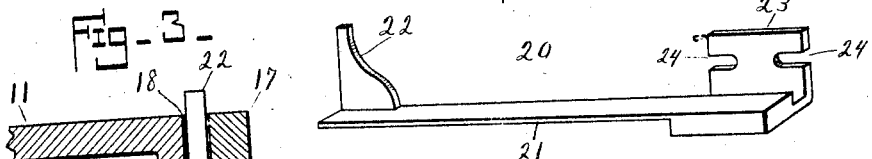
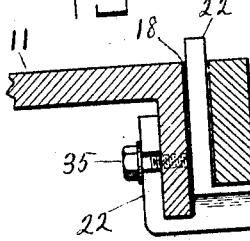
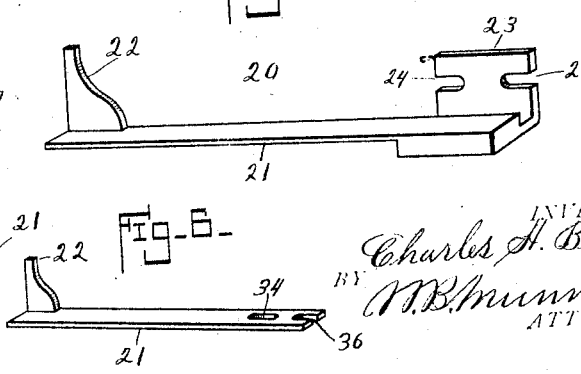
INVENTOR
Charles H. Budd,
BY W. B. Munnell.
ATTORNEY

UNITED STATES PATENT OFFICE.

CHARLES H. BUDD, OF NEW ALBANY, INDIANA.

SAW-GAGE.

1,382,059.  Specification of Letters Patent.  Patented June 21, 1921.

Application filed September 29, 1919. Serial No. 327,072.

*To all whom it may concern:*

Be it known that I, CHARLES H. BUDD, a citizen of the United States, residing in New Albany, county of Floyd, and State of Indiana, have invented a new and useful Improvement in Saw-Gages, of which the following is a specification.

This invention relates to saw gages, and is adapted to be used in connection with self feeding power driven saws, whereby they may be used either for edging or for ripping boards without altering the adjustment of the gage.

In many branches of wood work, what is termed ply wood, is extensively used. Ply wood consists of a core, usually formed or built up of strips of wood of an inferior quality which are glued together, edge to edge to form a board of requisite size, and having applied to each surface thereof, a plurality of superimposed layers of veneer. In building up cores, strips of varying widths under a maximum of about four inches are used. It is essential that the edges of the strips be plane surfaces, at right angles to the surface and substantially so to the ends. Boards, as they come from the kiln or yard, are of varying widths, and conditions, some having beveled or sloping edges, others having bark or sap on their edges and some tapering from one end to the other. They are first sawed to length on a cut off saw, and then taken to another saw to have their edges trued up. Economy requires that the strip cut off, in truing the edges, shall be as thin as possible. In feeding a board to the saw, the forward end thereof is placed in proximity to the self feeding mechanism, with the point at which it is desired the saw shall enter, opposite a guide finger, which is in alinement with the saw, the edge is then placed against the gage and the end pushed under the feed roll whereby it is carried to the rear of the machine, past the saw, which cuts off the edge, where a helper seizes it and slides it forward, on the saw table, to the operator who again feeds it through the saw to true the other edge. If the board is wider than the maximum allowable and has to be ripped, it must, if a rigid gage is used, be taken to another saw as it is not practicable to set the gage at frequent intervals. Efficiency demands that material be handled as little as possible, and moved as short a distance as possible, consequently if a board can be ripped on the same saw, upon which it is "edged" there will be a gain in efficiency.

An object of this invention is the provision of a device as characterized which will be economical in construction, easily installed, efficient in operation and durable in service.

With the foregoing and other objects in view, the invention consists of the novel construction and arrangement of parts illustrated in the accompanying drawing, which forms a part of this specification, wherein is set forth an embodiment of the invention, but it is to be understood that such changes and modifications may be resorted to as come within the scope of the appended claims.

In the drawings, wherein similar reference characters designate like parts in the several views, Figure 1, is a perspective view of a portion of a saw table with an embodiment of the invention attached thereto, associated parts being diagrammatically indicated: Fig. 2, a section on line 2—2 of Fig. 1: Fig. 3, a section on line 3—3 of Fig. 1: Fig. 4, a perspective view of the invention and Figs. 5 and 6, perspective views of modified forms.

Referring now in detail to the drawing, the reference numeral —10— designates a saw, which is mounted above a table —11—. Associated with the table is a feed belt —12— which projects thereabove, just sufficiently to bear against a board. Rollers —13— disposed on each side fore and aft of the saw, are adapted to press the board down upon the feed belt, with enough force to cause it to be carried along thereby. A protective guard, or shield —14— is disposed over the rollers and a guide finger —15— depends from the forward end thereof. The table is provided with a marginal depending flange —16— and to its forward edge a bar —17— is attached which bears a scale by which a gage may be adjusted. An embodiment of the invention designated as an entirety by the reference numeral —20—, (Fig. 4) comprises a resilient member —21— associated with which at one end is a stop, or pin —22— adapted to project above the surface of the table and provided on the other end with suitable means, for attachment to the table. As illustrated herewith the resilient member consists of a flat spring adapted to lie against the underside of the bar 17. The stop projects upward, from the inner edge of the spring, at the forward end thereof, through an opening, or slot —18—. A bracket —23— at the rear end of the spring, extends upward at right angles to the plane of the spring and is adapted to lie against the inner surface of the flange, 16. The bracket is provided with slots —24— extended inward from each end thereof through which screws —35— may be passed and engaged in the flange. By loosening the screws the gage may be adjusted within the limits of the slots and by taking out one screw, it may be removed.

In the modification shown in Fig. 5, the stop —32— and the bracket —33— are both positioned on the outer edge of the spring so as to permit the gage to be secured against the outer, or forward edge of the table. In the modification shown in Fig. 6, the bracket is dispensed with and the rear end of the spring is provided with a closed slot —34— and an open ended slot —35— through which screws may be passed whereby it may be secured to the underside of the table.

Having thus described my invention so that those skilled in the art can make and use the same I claim:

Claims—

1. In combination with a saw table having a depending marginal flange, a bar attached to the outer face of said flange, said bar having a recess on its inner face, a flat spring, a stop at one end of said spring projecting therefrom at right angles to its plane and adapted to extend above said table through said recess, and a bracket extended from the other end of the spring provided with means whereby it may be attached to said flange.

2. In combination with a saw table having a depending flange, a flat spring, a stop extended from one end of said spring at right angles to its plane and projecting above said table, and a bracket extended from the other end of the spring in a plane parallel with said stop and adapted to be secured to the flange and supporting the spring with one edge against the face of said flange.

CHARLES H. BUDD.